United States Patent [19]

Pollack

[11] Patent Number: 5,242,198
[45] Date of Patent: Sep. 7, 1993

[54] FLUID SWIVEL SEAL ARRANGEMENT

[75] Inventor: Jack Pollack, Camarillo, Calif.

[73] Assignee: Imodco, Inc., Calabasas Hills, Calif.

[21] Appl. No.: 842,076

[22] Filed: Feb. 26, 1992

[51] Int. Cl.⁵ .............................................. F16L 17/00
[52] U.S. Cl. ...................................................... 285/13
[58] Field of Search ..................... 285/13, 14, 93, 95, 285/131, 133.1, 272, 136

[56] References Cited

U.S. PATENT DOCUMENTS

| | | | |
|---|---|---|---|
| 2,726,104 | 12/1955 | Beitnott et al. | 285/98 |
| 2,964,366 | 12/1960 | Reynolds | 309/23 |
| 3,089,713 | 5/1963 | Scaramucci | 285/98 X |
| 3,290,068 | 12/1966 | Jackson | 285/276 |
| 3,521,893 | 7/1970 | Josephson | 277/188 |
| 3,901,517 | 8/1975 | Heathcott | 277/205 |
| 4,079,969 | 3/1978 | Wilson et al. | 285/98 |
| 4,272,108 | 6/1981 | Maasberg | 285/281 X |
| 4,348,039 | 9/1982 | Miller | 285/1 |
| 4,555,118 | 12/1985 | Saliger | 277/188 R |
| 4,602,806 | 7/1986 | Saliger | 285/135 |
| 4,626,003 | 12/1986 | Williams et al. | 285/98 |
| 4,647,076 | 3/1987 | Pollack et al. | 285/95 |
| 4,647,079 | 3/1987 | Ohlsson | 285/281 X |
| 4,662,657 | 5/1987 | Harvey et al. | 285/96 |
| 4,688,830 | 8/1987 | Meisinger et al. | 285/100 |
| 4,756,559 | 7/1988 | Shimada et al. | 285/272 X |
| 4,828,292 | 5/1989 | Jansen | 285/136 X |
| 4,925,219 | 5/1990 | Pollack et al. | 285/95 |
| 4,989,630 | 2/1991 | Yonezawa | 285/13 X |

Primary Examiner—Richard E. Moore
Attorney, Agent, or Firm—Arthur Freilich; Robert D. Hornbaker; Leon D. Rosen

[57] ABSTRACT

A fluid swivel, of the type that carries oil, natural gas, or other fluid between an undersea well or pipeline and a weathervaning ship, wherein the seal arrangement that prevents leakage of fluid is constructed to increase the seal lifetime and reduce the cost of the fluid swivel. The seal arrangement includes a recess (44, FIG. 2) in a first of the swivel parts and a seal assembly (46) therein which includes a pressure seal (50) and a backup ring (56). The backup ring has a dynamic side (64) lying adjacent to the portion (54) of the second swivel part that is sealed against, and has an opposite distal edge portion (72). The dynamic side of the backup ring has a tapered downstream portion (80) that is tapered at an angle A of no more than 30° to the axis of rotation (16) of the fluid swivel, with the downstream edge (82) of the tapered portion lying on a downstream wall (86) of the first swivel part rather than overhanging it. A drain conduit (90) is provided to drain fluid from the distal side (66) of the backup ring to the dynamic side 64 to prevent a substantial pressure difference across it. The distal edge portion (72) of the backup ring is closely received in a slot (70) of the first swivel part to slide therein, and an O-ring (74) lies at the bottom of the slot to bias the backup ring out of the slot.

21 Claims, 2 Drawing Sheets

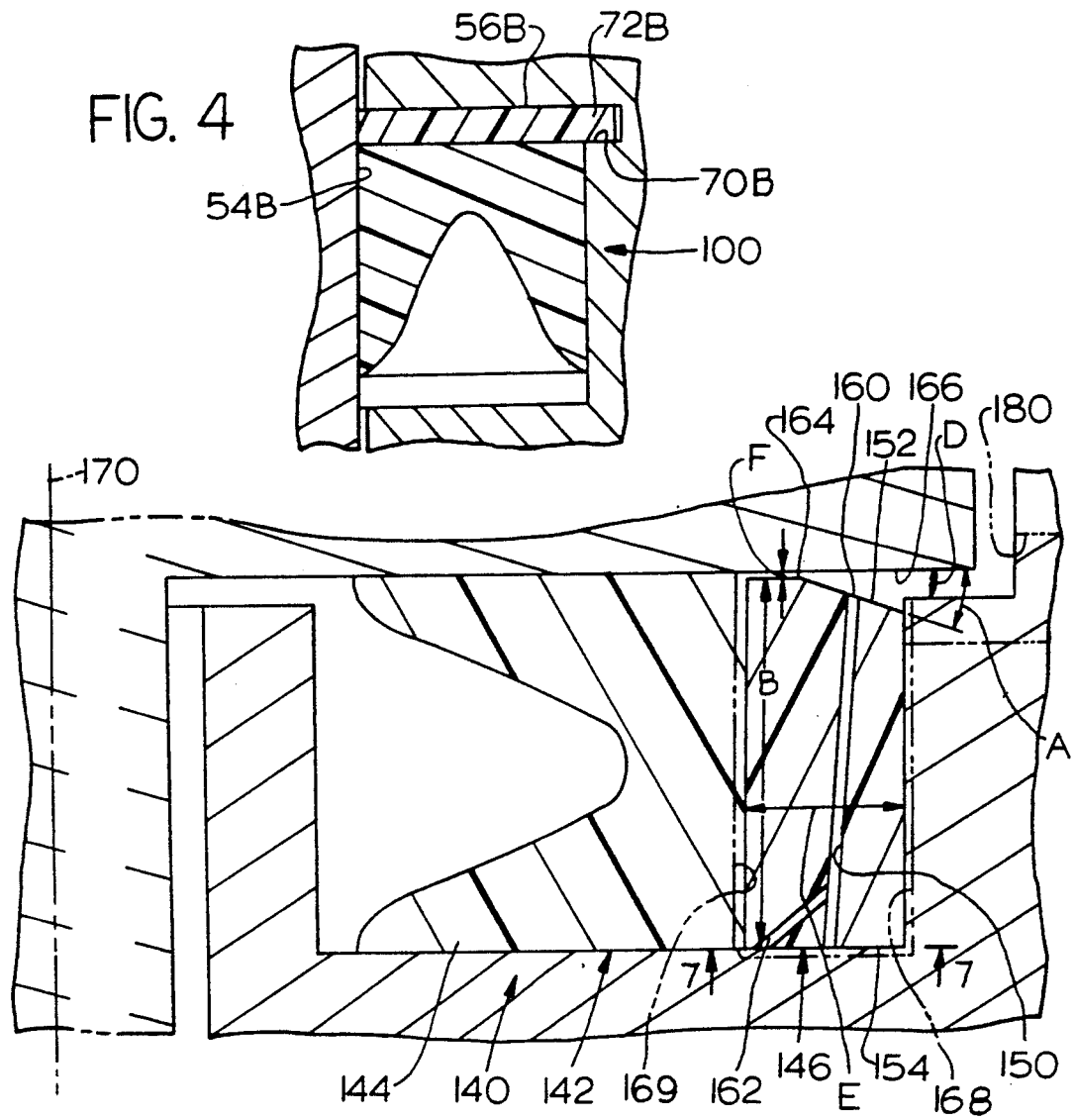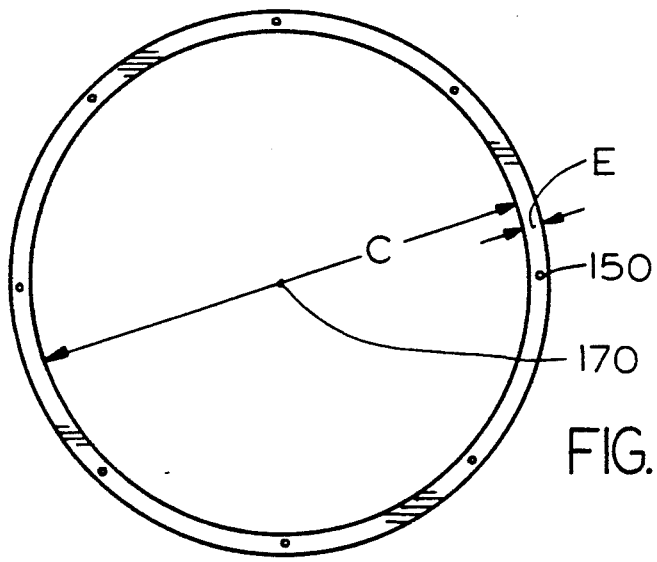

FLUID SWIVEL SEAL ARRANGEMENT

BACKGROUND OF THE INVENTION

Large fluid swivels with a sealing surface diameter typically between two to eight feet, that carry fluid at a high pressure, (over 1000 pounds per square inch), are used in offshore hydrocarbon floating production systems. In such a system, hydrocarbons such as oil and natural gas as well as other fluids, are transferred between an undersea well or pipeline and a ship, the fluid swivel allowing the ship to weathervane (turn with changing winds, waves and currents). Such fluid swivels often include inner and outer ring-shape swivel parts rotating on one another. An annular chamber is formed between the swivel parts, and a pair of gap passages extend from the chamber to the environment. One or more seal arrangements lie along each gap passage to prevent the leakage of pressured fluid into the environment. Each seal arrangement includes a seal assembly lying in a recess in one of the swivel parts (usually the outer swivel part) the assembly including a low friction material for a pressure seal and a harder backup ring on the downstream side of the pressure seal to support it. The seal material is usually structurally weak and a strong back up ring material is used to prevent seal extrusion at the high pressures.

One source of problems with fluid swivels of the type described above, arises from extrusion of the dynamic side or edge of the soft seal material past the hard backup ring. The large pressures of thousands of psi on the seal can cause deformation or creep of the seal material past the backup ring, leading to the extrusion of the seal into the gap passage. Such extrusion generally results in seal failure and can only be prevented by keeping the gap between the backup ring and swivel metallic sealing faces very small. This requires the backup ring to be closely toleranced to the width of the swivel seal cavity. Also, when the swivel is pressurized, the deformations of the seal cavity must not cause the backup ring to be tight or loose in the cavity. If the backup ring is too tight, it causes high friction which leads to high swivel torque and/or backup ring failure. If the backup ring it too loose, the seal may not be properly constrained, causing it to creep and extrude with eventual failure.

Another source of problems is that high compressive loads can be produced between the backup ring and the dynamic swivel seal face as a result of the leaking of pressured fluid into the region between the pressure seal and the backup ring. The leaked fluid can result in a large pressure drop across the width of backup ring. The pressure drop presses the backup ring toward the swivel face that is sealed against, causing high friction at the dynamic side of the backup ring. U.S. Pat. No. 4,647,076 by Pollack (the present inventor) and Mann describe this very important problem encountered in operation of large fluid swivels.

One partial solution for minimizing extrusion of the seal past the backup ring, is to construct the adjacent surfaces of the swivel parts to close tolerances, so the width of the extrusion gap is very small. Of course, the need to manufacture to close tolerances results in high cost, and even such close tolerances do not avoid extrusion in many circumstances. A fluid swivel with a seal arrangement constructed to minimize extrusion of the backup ring, which was effective in avoiding such extrusion in a large number of circumstances without requiring costly manufacture of the swivel parts to close tolerances, would be of considerable value.

SUMMARY OF THE INVENTION

In accordance with one embodiment of the present invention, a fluid swivel seal arrangement is provided which avoids extrusion of the backup ring which backs up the seal. The arrangement can include one or more drain passages extending between locations near the dynamic and distal sides of the backup ring, to drain away pressured fluid that might otherwise accumulate on the distal side of the backup ring. The dynamic side of the backup ring can be formed with a downstream portion tapered so the downstream end of the dynamic side is supported on the walls of the recess rather than overhanging them. The taper angle should be no more than 30°, and preferably no more than three fourths as much i.e. less than 22.5°). The walls forming the recess can include a slot that closely slidably receives the distal side of the backup ring that lies opposite the dynamic side. A spring such as an O-ring can lie at the bottom of the slot to constantly urge the backup ring out of the slot.

The novel features of the invention are set forth with particularity in the appended claims. The invention will be best understood from the following description when read in conjunction with the accompanying drawings.

BRIEF DESCRIPTION OF THE DRAWINGS

FIG. 4 is a partial sectional view of a fluid swivel constructed in accordance with one another embodiment of the invention, wherein there is no spring at the bottom of a slot that slidably receives the backup ring.

FIG. 6 is a partial sectional view of a fluid swivel constructed in accordance with another embodiment of the invention, wherein a drain conduit is formed largely in the backup ring.

FIG. 7 is a view of just the backup ring of FIG. 6, as taken on the line 7—7 of FIG. 6.

DESCRIPTION OF THE PREFERRED EMBODIMENTS

Figure 1:
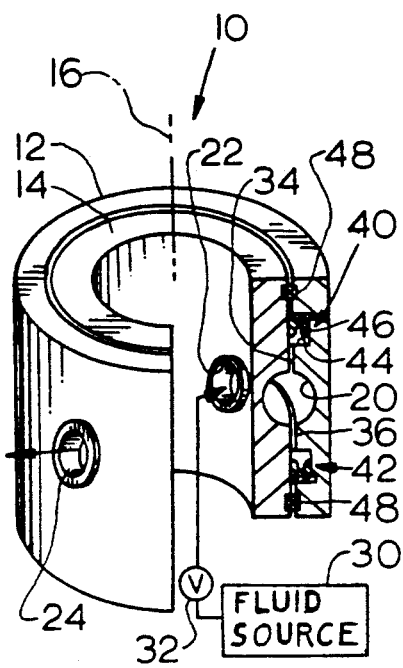
FIG. 1 is a partially sectional isometric view of a fluid swivel constructed in accordance with one embodiment of the present invention.

FIG. 1 illustrates a fluid swivel 10 constructed in accordance with the present invention, which includes outer and inner swivel parts 12, 14 that rotate relative to each other about an axis 16. Each of the parts forms about half of an annular chamber 20 between them. An inlet 22 on one of the parts such as the inner one receives fluid to pass through the fluid swivel, while the other part such as the outer one forms an outlet 24 through which the fluid passes out of the fluid swivel. Several fluid swivels of the type illustrated in FIG. 1 may be stacked on one another, with all rotatable about the same axis 16, to form a fluid swivel assembly. Typically, the outer swivel part 12 is fixed to the ship to weathervane with it, while the inner part 14 is connected to a riser that extends up from the floor of the ocean to the ship. A source of high pressure fluid 30 of a pressure of at least 1000 psi, such as an undersea well or pipeline, may pass fluid through the riser and through a shutoff valve 32 to the fluid swivel inlet 22.

The fluid swivel forms a pair of gap passages 34, 36 extending from the annular chamber 20 to the environment. The swivel parts have adjacent faces along the gap passages. It may be noted that it is possible to design a fluid swivel with a single gap passage. A seal arrangement 40, 42 lies along each gap passage, and includes a recess 44 and a seal assembly 46 in the recess. A pair of bearings 48 rotatably connect the swivel parts.

Figure 2:
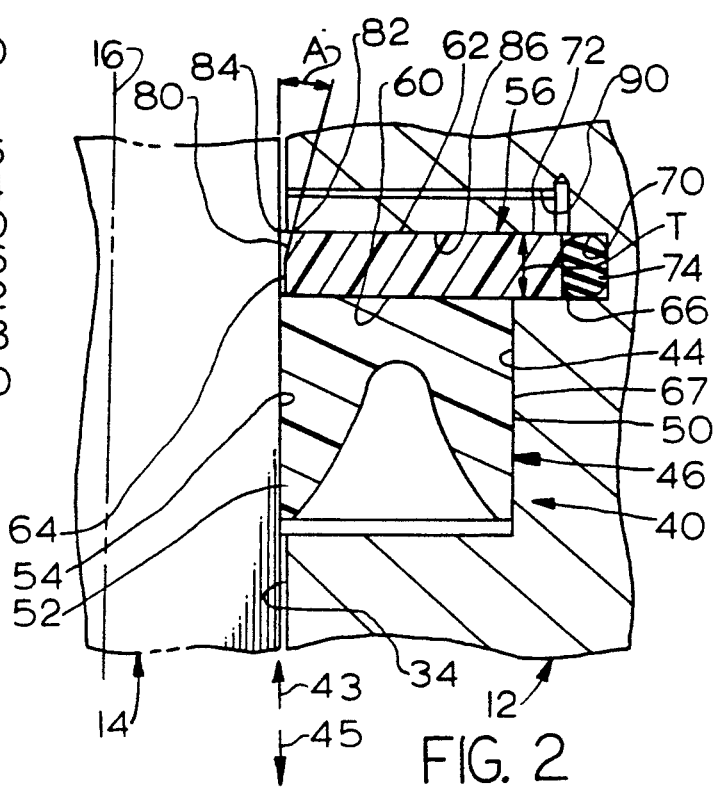
FIG. 2 is a partial sectional view of the fluid swivel of FIG. 1.

FIG. 2 shows some details of one of the seal arrangements 40 which blocks the passage of high pressure fluid that would otherwise move along the gap passage 34 into the environment. Arrow 43 indicates the downstream direction along which pressured fluid tends to move, while arrow 45 indicates the opposite upstream direction. The fluid pressure seal assembly 46 includes a ring-shaped pressure seal 50 of a "wing" shape, wherein one of the wings 52 is deflected by high pressure against a sealed surface portion 54 formed at the outside of the inner or second swivel part 14 (and which extends several inches downstream of the pressure seal). A backup ring 56 lies on the downstream end of the pressure seal 50 to back it up, the backup ring being constructed of a somewhat more rigid material than the pressure seal. The backup ring 56 has upstream and downstream ends 60, 62 and has dynamic and distal edges or sides 64, 66. The dynamic side 64 must lie close to the sealed surface portion 54 to support a portion of the pressure seal 50 thereat to prevent extrusion of that portion of the pressure seal. However, the dynamic side 64 of the backup ring should not press with high force against the sealed surface portion 54, since such high pressure could cause considerable friction that would make it difficult for the swivel parts to smoothly rotate relative to each other.

Figure 3:
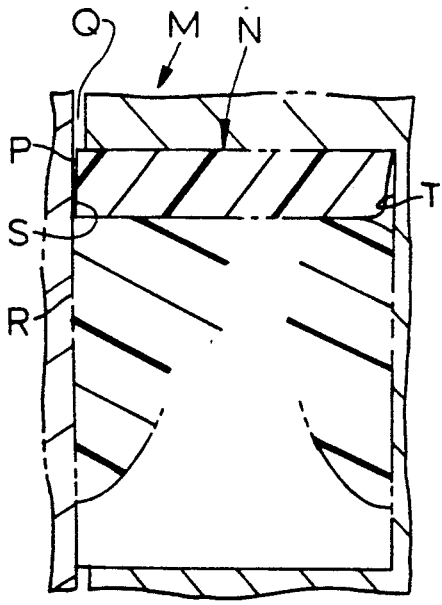
FIG. 3 is a partial sectional view of a prior art fluid swivel.

FIG. 3 illustrates a prior art seal arrangement M, wherein the backup ring N had a cross section of simple rectangular shape. One problem that occurred was that the dynamic side P of the backup ring did not stay tight against surface S when the swivel was pressurized, because the seal cavity and gap Q became wider as the swivel was pressurized. The gap between surfaces P and S therefore allowed the seal to extrude under pressure. Alternatively, when P stayed tight against S, a gap formed at T where leaked fluid and/or extruded seal material could accumulate. Such leaked fluid at pocket T could press the backup seal with high force against surface S. This not only reduced the lifetime of the backup ring and/or surface S, but tended to cause high friction between the dynamic side P of the backup ring and the sealed surface S of the other swivel part. Another problem that must be safeguarded against, is that the dynamic side P of the backup ring must lie very close to the sealed surface S, or else the pressure seal R will not be well backed up. Any gap between the dynamic side P of the pressure seal and the seal surface S must be less than about 10 mils (one mil equals one thousandth inch) and is usually designed to be much less than this. The sealed surface S may have a diameter such as two to eight feet, and may have a corresponding height, and the cost of machining such a surface to a tolerance of much less than twelve mils can be very high. Typically, much greater tolerances were used, and there was some difficulty in moving the relatively hard backup ring over some parts of the outer surface of the inner second swivel part to its final place.

The arrangement of FIG. 2 overcomes some of the problems discussed above. Applicant provides a backup ring-holding slot 70 for holding a distal side portion 72 of the backup ring. The slot closely holds the distal portion of the backup ring in slidable movement therein. As a result, during assembly of the fluid swivel, the slot provides a space for outward deflection of the backup ring during its installation over the outer surface of the second or inner swivel part 14. Applicant prefers to position a spring such as in the form of an O-ring of soft elastomeric material shown at 74, at the bottom of the slot. The spring constantly urges the backup ring out of the slot to assure that the dynamic side 64 of the backup ring will lie close to the sealed surface 54 or will press against it with light force. The ability to provide more "stretch" to the backup ring and still assure that its dynamic side will lie adjacent to the sealed surface, permits somewhat greater tolerances in the manufacture of the adjacent surfaces of the swivel parts.

Applicant helps avoid extrusion and/or chafing damage to the downstream end 62 of the backup ring by tapering a downstream portion 80 of the dynamic side 64 of the backup ring. The tapering results in locations progressively further from the annular chamber (i.e. progressively more downstream along arrow 43) lying progressively further from the sealed surface portion 54. The tapering is sufficient that the downstream end 82 of the downstream portion 80 always lies further from the sealed surface 54 than a corner 84 formed on the first swivel part 12 that holds the seal assembly. The first swivel part 12 has walls forming the recess, including a downstream wall 86 that supports the downstream end 62 of the backup ring. The corner 84 is formed at the edge of the downstream wall 86 where it merges with the gap passage 34. The tapered portion 80 is tapered at an angle A sufficient to assure that the downstream end 82 of the dynamic side of the backup ring will always be supported by the downstream wall 86 of the recess, and will never overhang the corner 84 thereof. By assuring that there will not be an overhang, applicant prevents extrusion and/or chafing damage of the backup ring as a result of the high downstream force applied near the dynamic side 64 of the backup ring.

Where the fluid applied to the large diameter fluid swivel is under a pressure of over one thousand psi, there is a significant increase in the radial width of the gap passage 34 after the high pressure fluid is applied to the swivel. The downstream end 82 of the tapered backup ring portion 80 should be supported after the high pressure is applied to the fluid swivel and the gap passage 34 has expanded in width. It might be thought that this could be accomplished by using a large taper angle A, but this could result in considerable deformation of the tapered portion 80. The taper angle A should be no more than 30° and preferably less than three quarters of that (i.e. less than 22.5°) from the axis 16 of rotation of the fluid swivel as seen in the sectional view. Actually, applicant prefers a taper angle A of about 17°. As a result of the need for the low taper angle, the thickness T of the backup ring is somewhat greater than common prior art backup rings. If the backup ring is not made of a hard plastic (modulus of elasticity on the order of $3 \times 10^5$), but is instead made of a much more rigid material such as brass (modulus of $1.5 \times 10^5$) or other metal, then extrusion is avoided without the need for tapering.

Applicant finds that one cause for extrusion of the backup ring into the gap passage, is the buildup of high fluid pressure on the distal side 66 of the backup ring. If some fluid leaks through the distal side 67 of the pressure seal 50, it can accumulate at the distal side 66 of the backup ring. Such pressured fluid at 66 tends to cause the dynamic side 64 of the backup ring to press with great force against the sealed surface 54 of the second swivel part. Such force causes large friction resisting turning of one part of the swivel on the other, and tends to promote heating, chafing and extrusion of the dynamic side of the backup ring. Applicant avoids such large pressure differentials across the backup ring, by providing one or more drain conduits 90.

Each drain conduit 90 connects the distal side 66 of the backup ring to a location along the gap passage 34 downstream of the pressure seal (or even into the environment) and therefore to the dynamic side of the backup ring. The drain conduit drains away any pressured fluid which reaches the distal side 66 of the backup ring to a gap passage location that is at least as far downstream as the downstream end of the pressure seal, and preferably at least as downstream as the tapered portion 80 of the dynamic side of the backup ring. Thus, if any high pressure fluid leaks past the distal side 67 of the pressure seal 50, such high pressure fluid can be drained away from the distal side of the backup ring to prevent a large pressure drop across the width of the backup ring. As discussed above, such a large pressure drop across the width of the backup ring could cause deflection of its dynamic side, resulting in a lower lifetime for the backup ring and also resulting in large frictional contact and heat buildup between the dynamic side of the backup ring and the sealed surface 54 of the second fluid swivel part 14. The drain conduit 90 shown in FIG. 2, is formed by holes drilled into the first swivel part 12.

FIG. 4 is a sectional view of the seal arrangement 100 of another fluid swivel, which is similar to that of FIG. 2, except that there is no spring at the bottom of the slot 70B that slidably holds the distal side portion 72B of the backup ring 56B. Although a spring such as an O-ring can be useful, it is not always necessary. The mere presence of the slot 70B is useful in providing room for "stretching" of the backup ring during its installation over the sealed surface 54B of the second swivel part, where there is an interference fit between the backup ring and some portions of the sealed surface. It is noted that the arrangements shown in FIGS. 1-4 are radial seal arrangements, where the sealed surface (e.g. 54, S, or 54B) faces radially (with respect to the axis of rotation).

Figure 5:
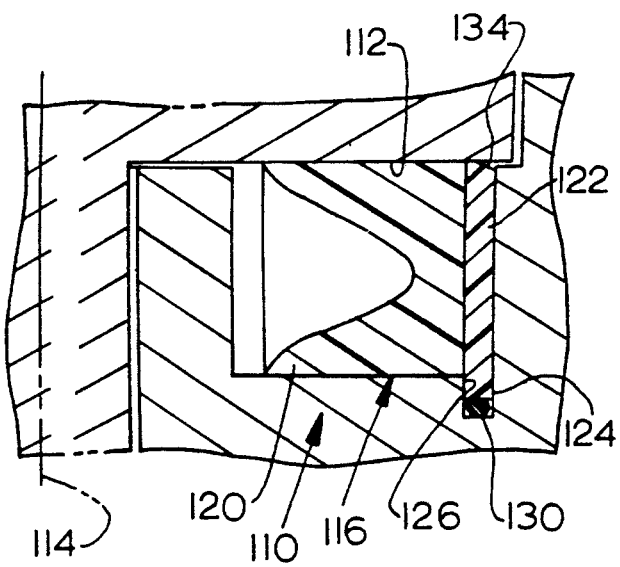
FIG. 5 is a sectional view of a fluid swivel constructed in accordance with another embodiment of the invention, wherein the seal assembly seals against an axially-facing surface.

FIG. 5 illustrates a face seal arrangement 110 wherein the sealed surface portion 112 lies in a plane orthogonal to the axis of rotation 114 instead of perpendicular to it (i.e. radial to it). The seal arrangement includes a seal assembly 116 comprising a pressure seal 120 and a backup ring 122. The backup ring 122 has a distal side portion 124 that lies in a slot 126 and that is constantly pressed in an axially direction by a spring 130 formed by an O-ring. In this situation, the spring 130 at the bottom of a slot 126 is highly preferable to assure constant pressing of the dynamic side 134 of the backup ring against the sealed surface portion 112. In the face seal arrangement of FIG. 5, the spring is highly preferred, because there is no tendency for the backup ring to move radially against the sealed surface portion, and it is possible for the backup ring to instead merely lie at the bottom of the slot and for its dynamic side to lie a large distance from the sealed surface.

FIGS. 6 and 7 illustrate another face seal arrangement 140 that applicant has designed. The arrangement includes a seal assembly 142 comprising a pressure seal 144 and a backup ring 146. A drain conduit 150 is formed by holes in the backup ring 146 that couples its dynamic and distal sides 152, 154. The conduit is formed by a pair of intersecting holes with one end 160 lying at or near the dynamic side of the backup ring and the other end at 162 lying at or near the distal side and upstream end of the backup ring. The conduit end shown at 160 preferably lies at or downstream from the location 164 where the backup ring lies closest to the dynamic or sealed surface portion 166. The advantage of forming the drain conduit in the backup ring itself, is that this can be done at lower cost, because it is easier to drill the plastic material of the backup ring (or a softer metal such as brass), than the steel material of the fluid swivel parts. Also, any mistake is less expensive since the backup ring is of relatively minor cost compared to the inner and outer parts of the fluid swivel. Nevertheless, it is possible to form part of the drain conduit as a hole in the swivel part 12 (shown at 90 in FIG. 2) or as a groove indicated at 168 in the swivel part. It is also possible to form the drain conduit as a hole or groove 169 in the pressure seal. Such hole or groove can be prevented from collapsing by placing a steel tube therein.

In a fluid swivel that applicant has designed of the type shown in FIGS. 6 and 7, having a sealed surface diameter C of four feet, the backup ring 146 had a height B of 0.75 inch and a thickness E (FIG. 6) of about 0.35 inch. The taper angle A was 17°. The pressure seal 144 was formed of TEFLON TM reinforced with about ten per cent by volume of various reinforcing materials. The backup ring 146 was made of a significantly stronger and more rigid plastic material having the ability to avoid creep at pressures up to at least 6,000 psi. The fluid swivel was designed to pass fluid at pressures of 6,000 psi. Because of the tapering, which assures that the downstream end of the dynamic side will not extrude into the gap passage, applicant was able to use a gap passage width D nominally about one sixteenth inch (0.06 inch).

Although the above construction reduces the possibility of extrusion of the backup ring, there still remains the problem of assuring a proper gap F (FIG. 6) in the loaded condition (compressed by high pressure fluid) of the backup ring. That is, the dynamic end (e.g. 152 in FIG. 6) of the backup ring must form only a small loaded gap F (e.g. less than 5 mils, where one mil equals one thousandth inch) at the upstream side, or only a slight interference (e.g. −1 mil) if any, anywhere. A larger loaded gap F could result in extrusion of the softer pressure seal 144, while a greater interference results in greater turning friction. Applicant places the backup ring so it has a large unloaded gap F before the high pressure fluid (e.g. at 6,000 psi) is applied. The unloaded gap F is chosen so that when fluid at the known working pressure (e.g. 6,000 psi) is applied, the expansion in the axial dimension B of the backup ring will result in a very small loaded gap F (or very slight interference).

The ratio of axial expansion (expansion of dimension B) with reduction of thickness E due to compression, is given by Poisson's ratio. Poisson's ratio ranges from about 0.25 to 0.45 for most materials and is about 0.4 for many engineering plastics.

The modulus of elasticity for hard engineering plastics suitable for the backup ring is on the order of $3 \times 10^5$. Thus, when 6,000 psi is applied to the backup ring, it will undergo a compression of about 0.020 inch per inch of thickness, and an axial expansion of about 0.4 times as much or about 0.008 inch per inch width. For an axial (parallel to axis 170) dimension B of 0.75 inch, this results in an axial expansion of 0.006 inch. The equation for contraction in gap width is:

$$\frac{P}{G} uB \qquad \text{Eq. 1}$$

where P is pressure such as 6,000 psi, G is modulus of elasticity, u is Poisson's ratio, and B is axial length, or height.

Thus, to achieve a loaded gap width F of 0.002 inch, applicant positions the backup ring to produce an unloaded (zero pressure) gap width F of 0.008 inch (so it will be 0.002 inch at 6,000 psi), which equals the desired loaded gap F plus the amount given by Equation 1. The loaded gap width F at the upstream end of the backup ring is almost always designed to be less than 0.01 inch, and preferably less than 0.005 inch at operating pressure (e.g. 6,000 psi). If the fluid swivel should be taken out of use, and then be used for carrying fluid at a different pressure (e.g. 3,000 psi), then the backup ring position can be adjusted to produce an initial or unloaded gap width F of 0.005 inch and final or loaded gap width F (under 3,000 psi) of 0.002 inch. It should be noted that the precise width of the gap J can be measured (at zero pressure) by a thickness gauge inserted through an inspection passage 180 leading to the outside, as is disclosed in U.S. Pat. No. 4,828,292 by Jansen, and that the unloaded gap can be adjusted with shims as is disclosed in said patent. It may be noted that maintaining a small loaded gap of less than 0.01 inch is important primarily for fluid swivels operating at at least 3,000 psi (or temperatures above 100° C.), so adjustment for the effects of backup ring expansion with pressure is important only for pressure of at least about 3,000 psi.

Where the temperature of the fluid which will pass through the swivel is considerably above the temperature (e.g. 20° C.) at which gap measurements are made (in the unloaded fluid swivel), account may be taken also for the thermal coefficient of expansion of seal ring material. Hydrocarbons from deep wells often have a temperature of 80° C. or more. Plastics suitable for backup rings (e.g. TEFLON) have thermal coefficients of expansion about fifteen times than of steel which is used for most parts of the fluid swivel.

Thus, the invention provides a seal arrangement for a fluid swivel, and especially of the type used in offshore installations to transfer hydrocarbons and other fluids between an undersea well or pipeline and a weathervaning ship, which increases reliability and reduces manufacturing cost. A seal arrangement lying along a gap passage extending from an annular chamber towards the environment, includes a seal assembly that lies in a recess of a first fluid swivel part and that seals against a dynamic surface or seal surface of a second fluid swivel part. The seal assembly includes a pressure seal and a backup ring. A drain conduit is provided to drain fluid from the distal side of the backup ring, to the part of the gap passage lying downstream of the upstream end of the backup ring, to prevent a large pressure difference across the width of the backup ring. The dynamic side of a hard plastic backup ring has a downstream portion that is preferably tapered, preferably at an angle of no more than 30° and even less, along a sufficient thickness that the downstream end of the dynamic side is always supported by a wall of the first swivel part, rather than overhanging a corner of it. The walls forming the recess that holds the seal assembly, can include a slot that closely slidably receives a distal side of the backup ring. A spring such as a soft elastomeric O-ring can lie at the bottom of the slot. The sealing gap width of the unloaded backup ring can be adjusted to be greater than the desired loaded gap width, by a closely calculated amount.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A fluid swivel, comprising:
   inner and outer fluid swivel parts rotatable relative to each other about an axis, said parts forming an annular chamber between them, with an inlet in one of said parts and an outlet in the other part both opening to said chamber, said parts forming a gap passage between them extending in a downstream direction from said annular chamber, and a first of said parts has a seal-holding recess along said gap passage which faces a sealed surface portion on the second of said parts;
   a fluid seal assembly for blocking the leakage of fluid in a downstream direction from said chamber toward the environment, said seal assembly lying in said recess and including a ring-shaped pressure seal and a backup ring lying downstream of said seal, said backup ring having a dynamic side that lies adjacent to said sealed surface portion and a distal side that lies opposite to said dynamic side;
   means forming at least one drain conduit connecting a location substantially at said distal side of said backup ring to a location along said gap passage that is downstream of said pressure seal, for draining away any pressured fluid which reaches the distal side of said backup ring.

2. The fluid swivel described in claim 1 including:
   a source of high pressure fluid of a pressure of at least 1000 psi, and a shutoff valve coupling said source to said inlet;
   said first part has recess walls forming said recess, said recess walls forming a corner on the downstream end of said recess at a side thereof which is closest to said sealed surface portion;
   said dynamic side of said backup ring has a downstream portion which is tapered so locations progressively further from said chamber are generally progressively further from said sealed surface portion, with the downstream end of said downstream portion lying further from said sealed surface portion than said corner of said first part even when said valve is open.

3. The fluid swivel described in claim 2 wherein:
   said downstream portion is tapered at an angle of less than 30° from an imaginary line extending parallel to said sealed surface portion as seen in a section view that includes said axis.

4. The fluid swivel described in claim 1 wherein:

said first part has recess walls forming said recess, said walls forming a backup-ring holding slot extending away from said sealed surface portion and having a thickness to closely slidably receive said distal side portion of said backup ring.

5. The fluid swivel described in claim 4 including:
a ring of elastomeric material lying in said slot and biasing said backup ring out of said slot.

6. A fluid swivel of the type that has ring-shaped inner and outer parts and bearings that allow rotation of one part about an axis relative to the other, said parts forming an annular chamber between them through which fluid passes from an inlet connected to one of said parts to an outlet connected to the other part, said parts form a gap passage between them extending in a downstream direction from said chamber, and a first of said parts has walls forming a seal-holding recess that holds a seal assembly that seals against a corresponding sealed surface portion of the second of said parts, wherein said seal assembly includes an annular pressure seal and a backup ring on the downstream side of said seal, said backup ring having a dynamic side that lies adjacent to said sealed surface portion and said backup ring having upstream and downstream ends, and said walls of said recess including a downstream wall with a corner lying closest to said sealed surface portion, characterized by:
said dynamic side of said backup ring has a downstream portion extending from a location between said ends of said backup ring to said downstream end of said backup ring, said downstream portion being angled to an adjacent part of said sealed surface portion so locations along said downstream portion that lie progressively more downstream generally lie progressively further from said sealed surface portion and the downstream end of said downstream portion lies further from said sealed surface than said corner, with the angle between said downstream portion of said backup ring and said sealed surface portion being no more than 30°.

7. The fluid swivel described in claim 6 wherein:
said taper angle is less than 22.5°.

8. The fluid swivel described in claim 6 including:
walls forming a drain passage which has opposite ends communicating respectively with said distal side and dynamic side of said backup ring to prevent a substantial pressure difference across said backup ring.

9. The fluid swivel described in claim 8 wherein:
said drain passage is formed in said backup ring.

10. The fluid swivel described in claim 6 wherein:
said recess walls form a backup ring-holding slot having a thickness to closely slidably receive a distal side portion of said backup ring that lies furthest from said sealed surface portion.

11. The fluid swivel described in claim 10 including:
a spring lying in said slot and biasing said backup ring out of said slot.

12. A fluid swivel comprising:
inner and outer fluid swivel parts rotatable relative to each other about an axis, said parts forming an annular chamber between them, with an inlet in one of said parts and an outlet in the ;other part both opening to said chamber, said parts forming a gap passage between them extending from said annular chamber, and a first of said parts has a seal-holding recess along said gap passage which faces an annular sealed surface portion on the second of said parts;

a fluid seal assembly for blocking the leakage of fluid from said chamber into the environment, said seal assembly lying in said recess and including a ring-shaped pressure seal and a backup ring lying on an end of said seal furthest from said chamber, said backup ring having a dynamic side that lies adjacent to said sealed surface portion and said backup ring having an opposite distal side portion;

said recess having an annular slot in a recess wall furthest from said sealed surface portion, which is just thick enough, to slidably receive said distal side portion of said backup ring, with said distal side portion being slidably disposed in said slot.

13. The fluid swivel described in claim 12 including:
a spring device lying in said slot and biasing said backup ring in a direction out of said slot toward said sealed surface portion.

14. The fluid swivel described in claim 13 wherein:
said spring device comprises an O-ring formed of an elastomeric material.

15. The fluid swivel described in claim 12 wherein:
means forming at least one drain passage coupled respectively to said distal side portion and to said dynamic side of said backup ring.

16. The fluid swivel described in claim 12 wherein:
said recess has a backup ring-support wall at a downstream recess location furthest from said chamber, said ring-support wall having a corner where said wall lie closest to said sealed surface portion;
said dynamic side of said backup ring has a downstream portion which is tapered at an angle of no more than 30° from said sealed surface so locations on said downstream portion that lie progressively further from said chamber generally lie progressively further from said sealed surface;
the portion of said backup ring containing said taper is thick enough that the downstream end of said dynamic side of said backup ring is supported on said ring-support wall and is free of any portion that overhangs said corner.

17. A fluid swivel of the type that has ring-shaped inner and outer parts and bearings that allow rotation of one part about an axis relative to the other, said parts forming an annular chamber between them through which fluid passes from an inlet connected to one part to an outlet connected to the other part, said parts form a gap passage between them extending in a downstream direction from said chamber, and a first of said parts has walls forming a seal-holding recess that holds a seal assembly that seals against a corresponding sealed surface of the second of said parts, wherein said seal assembly includes an annular pressure seal and a backup ring on the downstream side of said pressure seal, said backup ring having a dynamic side that lies adjacent to a dynamic or sealed surface portion formed on said second part and said backup ring having an opposite distal side, characterized by:
a plurality of drain conduits lying at locations spaced about said axis, with each drain conduit coupled to said distal and dynamic sides of said backup ring.

18. The apparatus described in claim 17 wherein:
said drain conduits include at least one hole in said backup ring.

19. A method for operating a fluid swivel of the type that has ring-shaped inner and outer parts and bearings that allow rotation of one part about an axis relative to the other part, said parts forming an annular chamber between them through which fluid passes from an inlet connected to one part to an outlet connected to the other part, said parts form a gap passage between them extending in a downstream direction from said chamber, and a first of said parts has a seal-holding recess that holds a seal assembly that seals against a corresponding sealed surface of the second of said parts along said gap passage, wherein said seal assembly includes an annular seal and a backup ring on the downstream side of said seal, said backup ring having a dynamic side that lies adjacent to a dynamic or sealed surface portion formed on said second part and said backup ring having an opposite distal side portion, characterized by:

establishing at least one drain conduit which is coupled to said dynamic side and said distal side portion of said backup ring, and allowing fluid to flow through said conduit.

20. A method for use with a fluid swivel for passing hydrocarbons which is designed for use at a high working pressure of at least about 3,000 psi, where the swivel has relatively rotatable inner and outer swivel parts forming an annular chamber and a gap passage between them extending from said annular chamber, said gap passage including a recess in the first part which faces a sealed surface portion on the second part, and said recess holds a ring-shaped pressure seal and a backup ring lying on a downstream end of the pressure seal, said backup ring having a distal side and having a dynamic side with an upstream end which must form a loaded gap between said backup ring and said seal surface portion of predetermined size F at said high working pressure, and wherein said backup ring is constructed of material of known modulus of elasticity G and known Poisson's ratio u, and said backup ring has a predetermined axial dimension B between said dynamic and distal sides, comprising;

adjusting the position of the dynamic side of said backup ring so when said fluid swivel is unloaded, the dimension of said gap equals $$F \text{ plus } \frac{P}{G} uB$$

and then applying fluid at said working pressure to said annular chamber to flow from there and along said gap passage to said pressure seal.

21. A fluid swivel comprising:

inner and outer fluid swivel parts rotatable relative to each other about an axis, said parts forming an annular chamber between them, with an inlet in one of said parts and an outlet in the other part both opening to said chamber, said parts forming a gap passage between them extending from said annular chamber, and a first of said parts has a seal-holding recess along said gap passage which faces a sealed surface portion on the second of said parts;

a fluid seal assembly for blocking the leakage of fluid from said chamber into the environment, said seal assembly lying in said recess and including a ring-shaped pressure seal and a backup ring lying against an end of said seal furthest from said chamber, said backup ring having a dynamic side that lies adjacent to said sealed surface portion and said backup ring having an opposite distal side portion, and said backup ring being slidable toward and away from said sealed surface;

a ring of elastomeric material which biases said backup ring in a direction toward said sealed surface.

* * * * *